June 11, 1968  A. J. WILSON  3,387,540
FLUID PRESSURE OPERATED BOOSTERS
Original Filed Nov. 21, 1963  2 Sheets-Sheet 1

June 11, 1968  A. J. WILSON  3,387,540
FLUID PRESSURE OPERATED BOOSTERS
Original Filed Nov. 21, 1963

United States Patent Office 3,387,540
Patented June 11, 1968

3,387,540
FLUID PRESSURE OPERATED BOOSTERS
Alexander J. Wilson, Warwickshire, England, assignor to Girling Limited, Tyseley, England, a British company
Original application Nov. 21, 1963, Ser. No. 325,227. Divided and this application Sept. 15, 1966, Ser. No. 579,542
Claims priority, application Great Britain, Nov. 21, 1962, 43,985/62
12 Claims. (Cl. 91—369)

ABSTRACT OF THE DISCLOSURE

In a pedal controlled vacuum booster particularly for braking systems, a deformable annular flexible plate abutting the pressure diaphragm and being adapted to dish to provide a reaction or "feel" on the pedal operated control valve. Though the plate can be of any construction whereby it deforms or dishes to provide "feel," one preferred construction is a diaphragm like plate having a series of radially directed flutes on its forward face adapted to abut against an annular abutment ring carried by the output member whereby the central part of the plate is moved rearwardly against the control valve.

This application is a division of application Ser. No. 325,227 filed Nov. 21, 1963.

This invention relates to improvements in fluid-pressure operated boosters of the kind in which power is generated by the application of differential fluid pressures to opposite sides of a movable wall under the control of a mechanically operated valve.

In systems employing boosters of this kind, and particularly in braking systems for vehicles where the valve is manually controlled, it is desirable that there should be a reaction on the valve operating rod or the like proportional to or dependent upon the differential pressures on opposite sides of the wall so that the operator is given the "feel" of the brakes and can more readily regulate their application.

According to one feature of my invention, in a fluid-pressure operated booster incorporating a control valve mechanism and a movable wall, the movable wall dishes or is deformed conically by differential pressure when the booster is energized, the dishing or deformation provide a reaction on the control valve dependent upon the differential pressures.

According to a further feature of my invention, in a fluid pressure operated booster incorporating a control valve mechanism and a movable wall, the control valve mechanism is received within the hollow stem of a generally mushroom shaped transmission member passing through the wall and the forward face of the wall abuts against one end of the transmission member to move it forward when the booster is energized, and the rear face of the wall abuts at a position radially inwards of the abutment with the transmission member against a reaction component slidable upon the stem, the wall dishing or deforming conically by differential pressure and the dishing or deformation provides a reaction on the control valve mechanism which is dependent upon the differential pressure.

The wall is provided with a central opening and the control valve is connected to the inner edge of the wall adjacent the opening.

The wall is conveniently provided by a flexible piston, or alternatively a diaphragm, which preferably is stiffened by a flexible ring secured thereto, and which may have a series of radially directed flutes on its forward face adapted to abut against an annular abutment ring on the head, the rear face of the wall providing the abutment with the reaction component.

Alternatively the head may have adjacent its periphery a series of circumferentially spaced abutments against which the portions of the disc between the flutes are adapted to bear.

A practical form of fluid-pressure operated booster embodying my invention is illustrated in the accompanying drawings in which.

Figure 1:
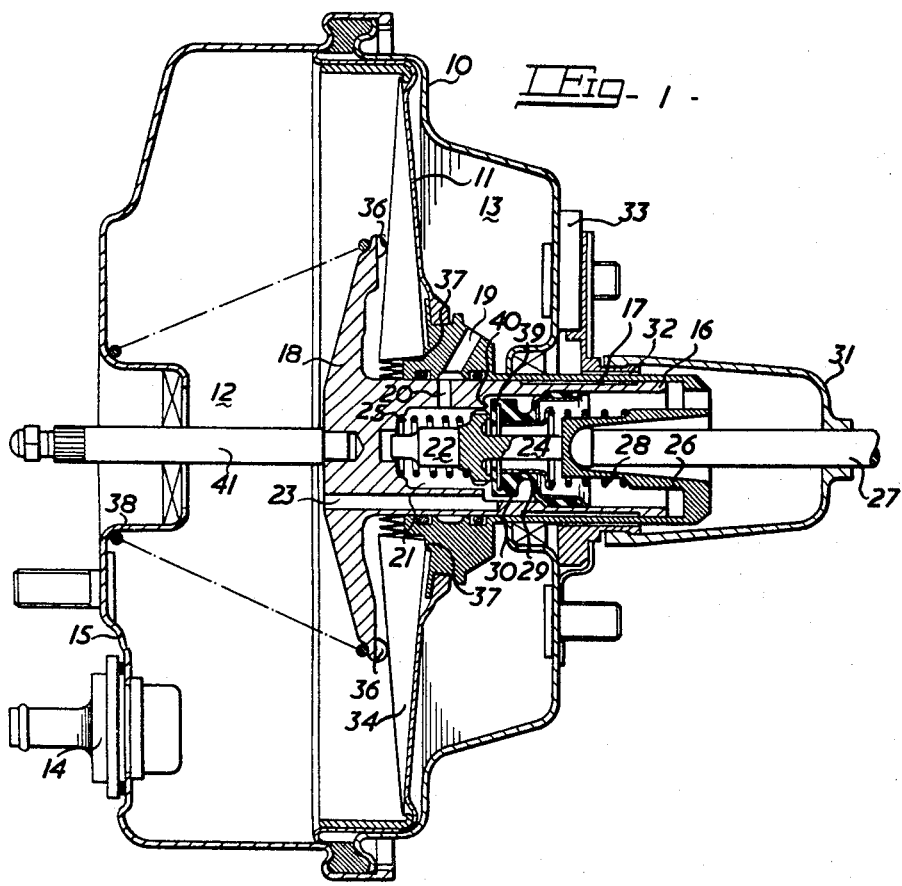
FIGURE 1 is a longitudinal section through a booster.

In the booster illustrated in FIGURE 1, 10 is a housing or cylinder of the booster which is divided by a diaphragm 11 into front and rear chambers 12 and 13 respectively. The forward chamber 12 is connected to the inlet manifold or other source of vacuum by a connection 14 housing a non-return valve and mounted on the front wall 15 of the cylinder and the rear chamber is also connected to vacuum through valve means controlling passages in a valve mechanism for the booster.

The valve mechanism comprises a pair of concentric sleeves 16 and 17 of which the inner sleeve 16 is slidably mounted in the outer sleeve 17 and is generally of mushroom shape having on its forward end a head 18 of substantial diameter. The rear chamber 13 is normally in communication with vacuum through a port 19 in the wall of outer sleeve 17 co-operating with a radial port 20 in the wall of the inner sleeve which leads into a blind bore 21 in which works an axially movable valve spool 22, the blind bore 21 communicating with the forward chamber 12 through a longitudinal bore 23 in the inner sleeve.

Stem 24 of the valve spool 22 is urged by a compression spring 25 into engagement at its rearward end with a forwardly extending axial portion 26 of the outer sleeve which is recessed to receive an actuating rod 27. The outer sleeve 17 is resiliently biased in a rearward direction by a compression spring 28 engaging at one end with the axial portion 26 of the outer sleeve and at the other end with a cylindrical abutment member 29 attached to a flexible rubber cylindrical boot like insert 30 connected to the inner sleeve. The rear ends of the sleeves are enclosed by a boot 31 through which the actuating rod extends and which is in communication with atmosphere through a passage 32 and an air filter 33.

Figure 2:
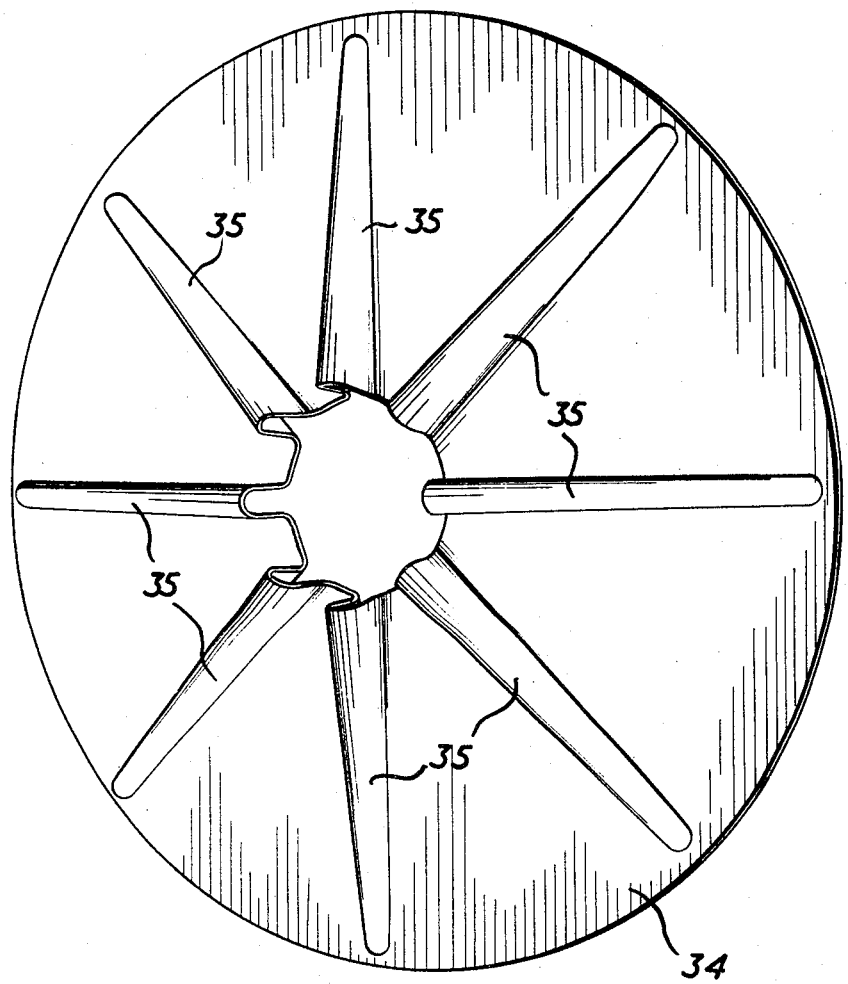
FIGURE 2 is an isometric view of a deformable wall incorporated in the booster shown in FIGURE 1.

The diaphragm 11 is clamped at its outer edge to the periphery of the housing or cylinder 10 and is secured at its inner edge to the outer sleeve 17. In front of the diaphragm there is a centrally apertured resilient or flexible sheet metal or other disc 34 (FIGURE 2) which is formed with a series of angularly spaced flutes 35 of which the axial depth tapers from a maximum at the centre to a minimum or zero at the periphery of the disc, the flutes being directed forwardly. The rear face of the disc is engaged by the diaphragm 11 over the outer part of its area, the flutes 35 bear at intermediate points in their lengths on a rearwardly facing annular abutment 36 on the head 18 of the inner sleeve 16, and the inner edge of the disc engages a forwardly facing annular shoulder 37 on the outer sleeve.

Normally both chambers 12 and 13 are in communication with a source of vacuum as described above, the diaphragm being balanced and held in position by a return spring 38. The spool valve 19 is resiliently urged into engagement with the forward face 39 of the rubber insert 30 to prevent atmospheric air from entering the rear chamber 13.

When the actuating rod is operated it moves the outer sleeve 17 forwardly to apply a forwardly directed force to the inner edge of the fluted disc 34 and at the same time it advances the valve spool 22 until the front face 39 of the rubber insert 30 engages an annular seating 40 in the inner sleeve 16 adjacent the bore 21 in which the valve spool works and which isolates the rear chamber of the booster by cutting off the vacuum supply through passage 23 in the inner sleeve 16.

Further movement of the actuating rod moves the valve spool away from engagement with the forward face 39 of the rubber insert to allow air to pass through the inner sleeve past the valve spool and through passages 20 and 29 in the sleeves and enter the rear chamber 13 to act on the diaphragm. As the diaphragm moves forwardly it takes with it the outer sleeve 17 which actuates the piston of the master cylinder through a rod 41 and the head 18 of the inner sleeve and at the same time it tilts the outer portion of the disc relative to the head and levers formed by the flutes 35 are tilted about their abutment 36 on the head and apply a rearwardly directed force to the outer sleeve by the engagement of the inner edge of the disc with the annular shoulder 37, this force being transmitted to the actuating rod 27 and hence to the operator's foot.

In another arrangement the annular abutment is replaced by separate circumferentially spaced abutments against which the portions of the disc between the flutes are adapted to bear.

In the event of failure of the booster the valve spool 22 is arranged to engage the inner sleeve at the forward end of the blind bore 21 so that the effort applied to the actuating rod can be transmitted mechanically through the two sleeves and the valve spool to the piston of the master cylinder to apply the brakes.

What is claimed is:

1. A fluid-pressure operated booster comprising a housing defining a power chamber, at least one pressure responsive wall movable in said housing and adapted to be subjected to differential fluid pressure when the booster is energized, said movable wall having a forward face and a rear face, an operating member, a force transmitting member, abutment means associated with said force transmitting member and engageable with said forward face of said movable wall to provide a fulcrum, means associated with said operating member co-operating with said rear face of said movable wall and adapted to abut said wall at a point spaced radially inward from said fulcrum, whereby upon energization of said booster said movable wall tilts about said fulcrum and applies to said operating member a reaction dependent upon the differential pressure to which said movable wall is subjected.

2. A fluid-pressure operated servo-motor comprising a housing defining a power chamber, a deformable pressure responsive wall movable within said housing and adapted to be subjected to differential fluid pressure when the servo-motor is energized, said movable wall having a forward face and a rear face, a first chamber on one side of said wall, a second chamber on the other side of said wall, an operating member within said first chamber, a force transmitting member within said second chamber, abutment means associated with said force transmitting member and adapted to engage an annulus on said forward face of said deformable wall spaced radially inward of a radius of said movable wall including its centre of pressure, said abutment means providing a fulcrum about which said wall deforms when the servo-motor is energized, and means associated with said operating member in abutment with said wall on an annulus spaced radially inward of said fulcrum whereby upon energization of said servo-motor said movable wall deforms about said fulcrum to produce a reaction on said operating member in proportion to the degree of energization.

3. A fluid-pressure operated booster comprising a housing defining a power chamber, a pressure responsive movable wall in said housing having a forward face and a rear face and adapted to be subjected to differential fluid pressure when said booster is energized, manual operating means co-operating with said rear face of said movable wall, pressure differential control means actuated upon operation of said manual operating means to affect movement of said movable wall, force transmitting member movable by said wall, abutment means on said force transmitting member engaging said forward face of said wall at a position radially inwards of the effective centre of pressure differential on the wall, and providing a fulcrum for said wall, whereby upon energization of said booster said movable wall pivots about said fulcrum to apply to said manual operating means a reaction proportioned to the differential pressure to which said movable wall is subjected.

4. A fluid-pressure operated booster as claimed in claim 3, wherein said manual operating means co-operates directly with said rear face of said movable wall, and said wall is movable solely by said manual operating means upon failure of said pressure differential control means.

5. A fluid-pressure operated booster as claimed in claim 3, wherein said manual operating means co-operates with said rear face of said movable wall at a position radially inwards of the position at which said abutment on said force transmitting means engages said forward face of said movable wall.

6. A fluid-pressure operated booster as claimed in claim 3, wherein said manual operating means and said force transmitting means are normally relatively movable to actuate said pressure differential control means, and are movable in unison upon failure of said control means.

7. A fluid-pressure operated booster as claimed in claim 3, wherein said manual operating means and said force transmitting means are movable in unison upon failure of said control means without force transmission through said pressure differential control means.

8. In a fluid pressure motor mechanism, a motor having an expansible chamber, a flexible diaphragm forming one wall of said chamber, a distortable diaphragm plate supporting said diaphragm, valve means adapted to direct fluid pressure from a source to said expansible chamber and from said chamber, means engaging said diaphragm plate to transmit force from said diaphragm plate, said diaphragm plate being adapted to distort in response to the fluid pressure in said expansible chamber, and manually operable means to control said valve means, said diaphragm plate directly engaging said manually operable means whereby distortion of said diaphragm plate opposes said manually operable means to thereby tend to reduce the power of said motor mechanism.

9. In a fluid pressure motor mechanism, a motor having an expansible chamber, a flexible diaphragm forming one wall of said chamber, a distortable diaphragm plate adapted to support said diaphragm, and control means including valve means for controlling communicating between said expansible chamber and a source of fluid pressure and further including a manually operable unit, said diaphragm plate being distortable in response to fluid pressure in said expansible chamber and having a portion directly engaging said manually operable unit when the latter operates said valve mechanism, whereby distortion of said diaphragm plate causes it to oppose movement of said manually operable unit and thereby tend to reduce the power of said motor mechanism.

10. A fluid pressure motor mechanism comprising a motor having an expansible chamber, an annular flexible diaphragm forming one wall of said chamber, an annular distortable diaphragm plate supporting said diaphragm, control means including a manually operable unit and control valve means partly carried by said manually operable unit for controlling communication between said expansible chamber and a source of fluid pressure, an axial body in which said manually operable unit is axially movable, and means co-acting between said body and said plate intermediate the radially outer and inner limits of the latter for fulcrumming said plate whereby the outer portion of said plate is flexed in the direction of movement urged by pressure in said chamber while the radially inner portion of said plate tends to rock in the opposite direction, said radially inner portion of said plate being directly engageable with said manually operable unit to oppose valve-operating movement thereof to thereby tend to reduce the power of said motor mechanism.

11. A fluid pressure motor mechanism comprising a motor having an expansible chamber, a flexible diaphragm forming one wall of said chamber, a distortable diaphragm plate member supporting said diaphragm, a rigid axial body member forming with said diaphragm and with said plate member a pressure-responsive unit for said motor, one of said members having rib means engageable by the other of said members and forming fulcrum means for said plate member whereby the admission of pressure to said chamber moves the radially outer portion of said plate member and said diaphragm in one direction and rocks the inner portion of said plate member in the opposite direction, said rib means being arranged closer to the radially inner limit of said diaphragm than to the radially outer limit whereby pressure acting against the radially outer portion of said diaphragm produces a moment about said fulcrum means greater than the moment acting in said opposite direction radially inwardly of said fulcrum means, and control means including a manually operable unit and valve means partly carried thereby for supplying pressure to said chamber upon operation of said manually operable unit, the radially inner portion of said plate member being engageable with said manually operable unit upon the fulcrumming of said plate member to oppose valve operating movement of said manually operable unit.

12. A motor mechanism according to claim 11 wherein said plate is annular and has its surface continuity disturbed to vary the normal stiffness thereof to determine its resistance to distortion and thus vary the pressure in said chamber necessary to engage the radially inner portion of said plate with said manually operable unit and oppose movement of the latter.

References Cited
UNITED STATES PATENTS 3,183,789  5/1965  Stelzer _____ 91—369

PAUL E. MASLOUSKY, *Primary Examiner.*